US012666521B2

(12) United States Patent
Stenger et al.

(10) Patent No.: US 12,666,521 B2
(45) Date of Patent: Jun. 23, 2026

(54) PLASMA RADIO-FREQUENCY WAVEGUIDE SWITCH

(71) Applicant: NORTHROP GRUMMAN SYSTEMS CORPORATION, Falls Church, VA (US)

(72) Inventors: Peter A. Stenger, Woodbine, MD (US); Adeyemi Adegbite, Linthicum Heights, MD (US); Grant C. Miars, Detroit, MI (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 32 days.

(21) Appl. No.: 18/934,977

(22) Filed: Nov. 1, 2024

(65) Prior Publication Data

US 2026/0129741 A1 May 7, 2026

(51) Int. Cl.

| | |
|---|---|
| ***H05H 1/46*** | (2006.01) |
| ***H01P 1/08*** | (2006.01) |
| ***H01P 1/10*** | (2006.01) |
| ***H01P 3/12*** | (2006.01) |

(52) U.S. Cl.

CPC ............. *H05H 1/4652* (2021.05); *H01P 1/08* (2013.01); *H01P 1/10* (2013.01); *H01P 3/12* (2013.01)

(58) Field of Classification Search

CPC .. H01P 3/16; H01P 11/003; H01P 3/00; H01P 3/06; H01P 3/085; H01P 1/14; H01P 1/173; H05H 1/46; H05H 1/463; H05H 1/4622; H05H 1/461; H05H 1/30; H05H 1/4652; H05H 1/24

See application file for complete search history.

(56) References Cited

U.S. PATENT DOCUMENTS

| | | | |
|---|---|---|---|
| 3,648,100 | A | 3/1972 | Goldie et al. |
| 3,845,427 | A | 10/1974 | Schubert |
| 5,663,694 | A | 9/1997 | Goebel et al. |

(Continued)

OTHER PUBLICATIONS

Jiansen Zhao, et al., "Plasma antennas driven by 5-20 kHz AC power supply", AIP Advances 5, 127114 (2015), https://doi.org/10.1063/1.4938084, 12 sheets.

(Continued)

*Primary Examiner* — Wei (Victor) Y Chan

(74) *Attorney, Agent, or Firm* — KATTEN MUCHIN ROSENMAN LLP

(57) ABSTRACT

The plasma radio-frequency (RF) waveguide switch utilizes the RF transmission cutoff frequency property of ionized gas (plasma) to implement an RF switch in waveguide. The plasma RF waveguide switch includes a waveguide defining an inner space and having an input port for receiving an RF signal and an output port, a plasma chamber placed in the inner space, ionizable gas contained in the plasma chamber, and at least one activator configured to activate the ionizable gas into a plasma state. The plasma chamber is self-contained and hermetically sealed, and therefore, the plasma RF waveguide switch does not require an external gas tank or gas supply device. The plasma chamber includes a first dielectric hermetic waveguide window at a side of the plasma chamber and a second dielectric hermetic waveguide window at an opposite side of the plasma chamber.

16 Claims, 5 Drawing Sheets

(56) References Cited

U.S. PATENT DOCUMENTS

| | | | | |
|---|---|---|---|---|
| 2011/0115380 A1* | 5/2011 | Ebe | H05H 1/46 315/111.41 |
| 2014/0150975 A1* | 6/2014 | Ebe | H01J 37/3211 156/345.48 |
| 2019/0206703 A1* | 7/2019 | Zhao | H01J 37/32155 |

OTHER PUBLICATIONS

Thomas R. Jones, et al., "A Photogenerated Silicon Plasma Waveguide Switch and Variable Attenuator for Millimeter-Wave Applications", Nov. 2021, IEEE Transactions on Microwave Theory and Techniques, pp(99):1-1, DOI: 10.1109/TMTT.2021.3121692, https://www.researchgate.net/publication/352758230_A_Photogenerated_Silicon_Plasma_Waveguide_Switch_and_Variable_Attenuator_for_Millimeter-Wave_Applications, 10 sheets.

Ms Nikoo, et al., "Nanoplasma-Enabled Picosecond Switches for Ultra-Fast Electronics", Plasma Science, 2020 IEEE International Conference on Plasma Science (ICOPS), (2020), DOI: 10.1109/ICOPS37625.2020.9717517, https://infoscience.epfl.ch/server/api/core/bitstreams/77819548-be1c-4615-9324-238ddfad1450/content, 15 sheets.

* cited by examiner

PLASMA RADIO-FREQUENCY WAVEGUIDE SWITCH

BACKGROUND

Waveguide based RF switching networks are used to route high power radio-frequency (RF) signals with very low loss in some paths and with very high isolation in other paths. Radar sensors require switching between a high power transmit signal path and receive path. This switching must often be performed rapidly (in less than 1 microsecond) for radar applications. This combination of requirements often limits radar system performance, warranting the active development of more waveguide switch options.

High switching speeds, high power handling and high isolation are of utmost importance for radar and electronic warfare (EW) systems. State of the art waveguide switching devices include bias controlled positive-intrinsic-negative (PIN) diodes that connect across the waveguide height at the center where the voltage is maximum in the dominant transverse electric TE10 mode. Ferrite element switches are often implemented in the waveguide volume which use the Faraday rotator effect to achieve the ON/OFF switching states. Electromechanical waveguide switches are also used for high isolation applications, but they are quite large and slow.

Plasma waveguide switches have been developed by using metallic or insulating cone configurations, or by using a gas reservoir. However, these designs are not considered practical to deploy as a commercial product or product line these days. There have been recent breakthroughs in using light to generate a free electron plasma in silicon and using the free electron plasma as a waveguide switch. This is another approach to the plasma waveguide switch, but is proprietary and considered to have lower performance such as in isolation and frequency range.

SUMMARY

The disclosed invention provides a plasma radio-frequency (RF) waveguide switch to solve the problems described above, and also provides RF-signal control apparatuses using the plasma RF waveguide switch of the disclosed invention. The plasma-based RF waveguide switch of the disclosed invention offers substantially enhanced performance in switching speed and isolation that make it highly desirable for radar applications.

The plasma RF waveguide switch of the disclosed invention utilizes the RF transmission cutoff frequency property of ionized gas (plasma) to implement an RF switch in waveguide. The ionizable gas is in general highly transmissive when the gas is not ionized, but sufficient ionization of the gas results in a highly reflective RF media below the plasma cutoff frequency. The plasma RF waveguide switch of the disclosed invention includes a self-contained plasma volume that does not require an external gas tank or gas supply device. This configuration differs from previous laboratory plasma waveguide switches that use the reflective nature of plasma, because the plasma RF waveguide of the disclosed invention is much cheaper and simpler to build and operate, also providing enhanced performance practically applicable for radar and EW applications.

These advantages and others are achieved, for example, by a plasma radio-frequency (RF) waveguide switch that includes a waveguide defining an inner space and having an input port for receiving an RF signal and an output port, a plasma chamber placed in the inner space, ionizable gas contained in the plasma chamber, and at least one activator configured to activate the ionizable gas into a plasma state. The plasma chamber is self-contained and hermetically sealed. The plasma chamber includes a first dielectric hermetic waveguide window at a side of the plasma chamber and a second dielectric hermetic waveguide window at an opposite side of the plasma chamber.

The ionizable gas may include argon, xenon, non, krypton, hydrogen and/or helium. The first and second dielectric hermetic waveguide windows may be $\lambda/2$ thick or electrically thin, where $\lambda$ is a wavelength of the RF signal received in the waveguide. The activator may include one or more filaments placed inside the plasma chamber and filament electrodes through hermetic feedthroughs connecting the one or more filaments to a ballast. The one or more filaments may be placed along broad walls of the waveguide near the middle of a width of the plasma chamber, minimizing the parasitic effects on the RF signal since the electric field gradients are minimal at the center of waveguide broad wall. In another embodiment, the activator may include a capacitor including a first electrode layer disposed outside the plasma chamber and a second electrode layer disposed outside the plasma chamber facing the first electrode layer. In still another embodiment, the activator may include an induction coil disposed outside the plasma chamber.

These advantages and others are further achieved, for example, by a single pole double throw (SPDT) switch that includes a waveguide defining an inner space and including an input section for receiving an RF signal and a first and second output sections that separate from the input section at a waveguide junction of the waveguide, a first plasma chamber placed in the first output section, a second plasma chamber placed in the second output section, ionizable gas contained in the first and second plasma chambers, a first activator configured to activate the ionizable gas in the first plasma chamber into a plasma state, and a second activator configured to activate the ionizable gas in the second plasma chamber into a plasma state. The first plasma chamber is self-contained and hermetically sealed, and the first plasma chamber includes a first dielectric hermetic waveguide window at a side of the first plasma chamber and a second dielectric hermetic waveguide window at an opposite side of the first plasma chamber. The second plasma chamber is self-contained and hermetically sealed, and the second plasma chamber includes a first dielectric hermetic waveguide window at a side of the second plasma chamber and a second dielectric hermetic waveguide window at an opposite side of the second plasma chamber.

BRIEF DESCRIPTION OF THE DRAWINGS

The preferred embodiments described herein and illustrated by the drawings hereinafter are included to illustrate and not to limit the invention, where like designations denote like elements.

FIG. 3A illustrates OFF state in which the ionizable gas is not activated, and FIG. 3B illustrates ON state in which the ionizable gas is activated by the activator to become plasma.

DETAILED DESCRIPTION

Figure 1:
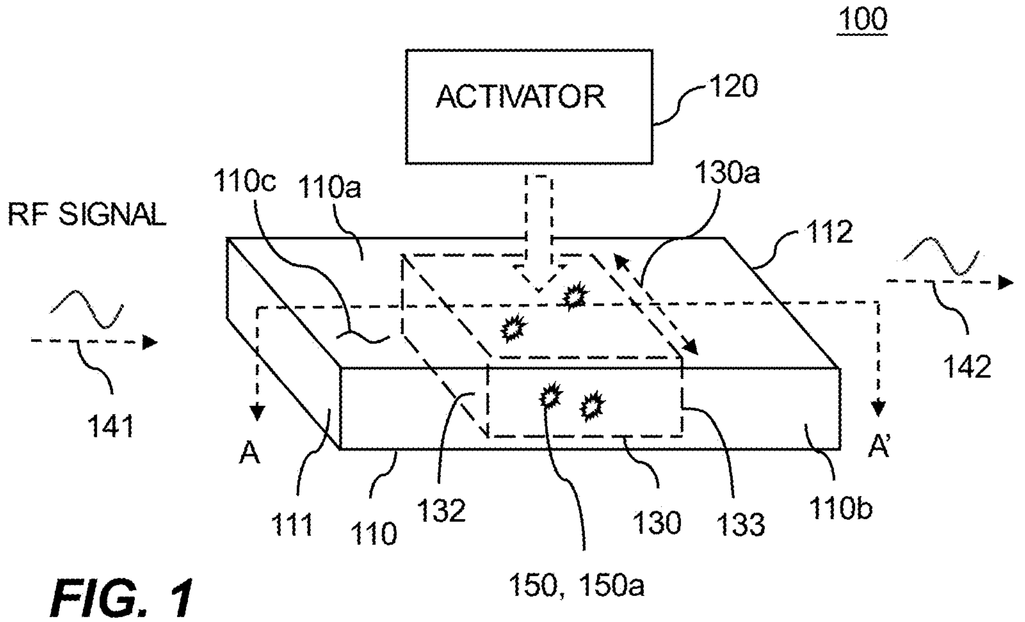
FIG. 1 is a perspective view diagram of an embodiment of a plasma radio-frequency (RF) waveguide switch of the disclosed invention.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

With reference to FIG. 1, shown is a perspective view diagram of an embodiment of plasma radio-frequency (RF) waveguide switch 100 of the disclosed invention. For description purpose, FIG. 1 shows a single pole single throw (SPST) plasma RF waveguide switch 100. However, the plasma RF waveguide switch 100 of the disclosed invention can be constructed in the other configurations such as single pole double throw (SPDT) and double pole double throw (DPDT) configurations.

The plasma RF waveguide switch 100 includes waveguide 110 defining an inner space 110*c* that directs RF signals, and plasma chamber 130 placed in the inner space 110*c* of the waveguide 110. The waveguide 110 has broad walls 110*a* on the top and bottom of the waveguide 110 and narrow walls 110*b* on sides of the waveguide 110. The broad walls 110*a* and the narrow walls 110*b* define the inner space 110*c* inside the waveguide 110. Herein, the broad walls 110*a* are walls having relatively greater widths among walls of the waveguide 110, and the narrow walls 110*b* are walls having relatively smaller widths among walls of the waveguide 110. The waveguide 110 includes input port 111 through which input RF signal or wave 141 enters the waveguide 110 and output port 112 through which any RF signal or wave 142 transmitted through the plasma chamber 130 may be output.

The plasma chamber 130 is disposed in the inner space 110*c* defined by the walls 110*a*, 110*b*. The plasma chamber 130 includes dielectric hermetic waveguide window 132 at a side of the input port 111 and another dielectric hermetic waveguide window 133 at a side of the output port 112. The dielectric hermetic waveguide windows 132, 133 may be transparent to the incident RF signal 141, and may be electrically thin (in terms of an electrical length) or λ/2 thick (where λ is a wavelength of the incident RF signal 141) for minimal reflection during OFF state in which the RF signal 141 may pass the plasma chamber 130. The plasma chamber 130 is filled with ionizable gas 150, such as argon, xenon, neon, krypton, hydrogen and/or helium, which May become plasma 150*a* when activated. The plasma chamber 130 is self-contained with the walls 110*a*, 110*b* and the dielectric hermetic waveguide windows 132, 133, and the ionizable gas 150 is a gas volume isolated inside the hermetically sealed plasma chamber 130. The plasma chamber 130 is not connected to any gas reservoir or gas supply device, and therefore the plasma RF waveguide switch 100 does not require external gas tank or supply device.

The plasma RF waveguide switch 100 further includes activator 120 that is a device configured to activate the ionizable gas 150 and is coupled to the plasma chamber 130 to activate the ionizable gas 150 inside the plasma chamber 130.

Figure 2:
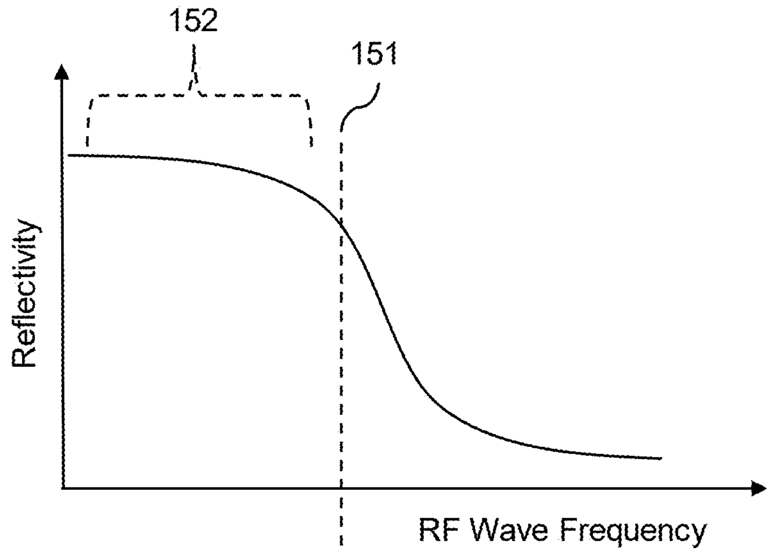
FIG. 2 is an exemplary graph illustrating plasma cutoff frequency (or plasma frequency).

With reference to FIG. 2, shown is an exemplary graph illustrating plasma cutoff frequency (or plasma frequency) 151. The horizontal axis represents a frequency of the incident RF wave or signal 141 and the vertical axis represent reflectivity of the activated ionizable gas 150*a* in a plasma state. If the incident RF waves 141 has frequencies smaller than the plasma cutoff frequency 151, the RF waves 141 cannot pass the plasma 150*a*. These incident RF waves below the plasma cutoff frequency 151 are reflected by the plasma 150*a*. The plasma works like a metal layer or a reflector for the RF waves having frequencies in the frequency range 152. The plasma frequency $\omega_{pe}$ can be obtained as shown in the equation below.

$$\omega_{pe} = 2\pi f_{pe} = \sqrt{\frac{ne^2}{m\varepsilon_0}} \text{ rad/sec},$$

where n is an electron number density in particles/$m^3$, e is the electron charge of $1.60\times10^{-19}$ coulombs, m is the effective mass of the electron at $9.11\times10^{-31}$ kg, and $\varepsilon_0$ is the permittivity of free space at $8.85\times10^{-12}$ $m^{-3}$ $kg^{-1}$ $s^4$ $A^2$. The plasma cutoff frequency 151 is tunable with increased power increasing plasma density and thus frequency.

Figure 3A:
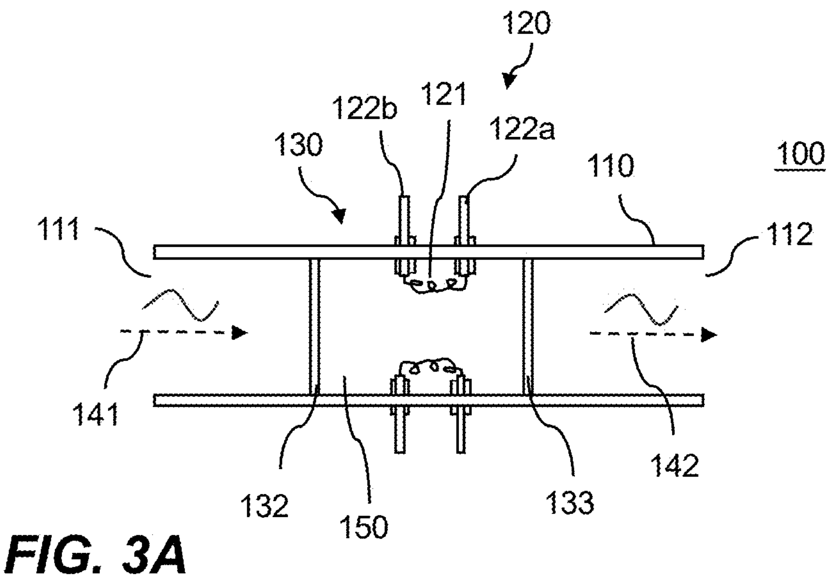
FIGS. 3A-3B are cross-sectional views of the waveguide along the line A-A' shown in FIG. 1.
Figure 3B:
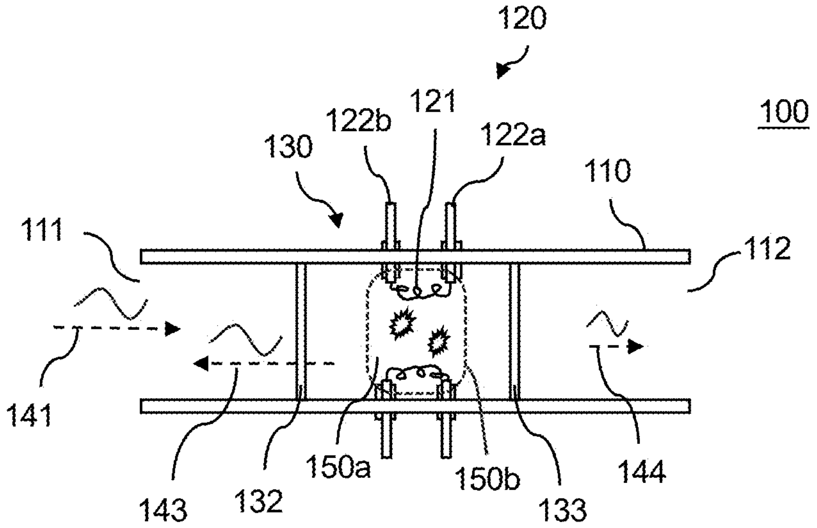

With reference to FIGS. 3A-3B, shown are cross-sectional views of the waveguide 110 along the line A-A' shown in FIG. 1. FIG. 3A illustrates OFF state in which the ionizable gas 150 is not activated, and FIG. 3B illustrates ON state in which the ionizable gas 150 is activated by the activator 120 to become plasma 150*a*. In order to describe the operation of the plasma RF waveguide switch 100, FIGS. 3A-3B exemplarily show an embodiment in which the activator 120 includes a pair of filaments 121 connected to filament electrodes 122*a*, 122*b*.

Referring to FIGS. 3A-3B, an ionizable gas volume 150 is implemented in the plasma RF waveguide switch 100, and is isolated in the space surrounded by the walls 110*a*, 110*b* of the waveguide 110 and the dielectric hermetic waveguide windows 132, 133. The ionizable gas 150 can be ionized into a plasma state 150*a* by activating the ionizable gas 150 via the activator 120, thus achieving a high ON/OFF impedance ratio that controls the level of the propagation of RF waves through the waveguide 110. It takes advantage of the plasma cutoff frequency 151 which is proportional to the square root of the density of the ionized gas (plasma) 150*a*.

For RF waves with frequencies below the plasma cutoff frequency 151, the plasma 150*a* works as a reflective layer to the RF waves as shown in FIG. 2. Therefore, the plasma RF waveguide switch 100 of the disclosed invention enables RF waves to pass through the waveguide 110 with very low loss (OFF state), and also can be electronically switched to a high loss state (ON state).

In order to form the plasma chamber 130, a pair of hermetic waveguide windows 132, 133 are implemented in a standard waveguide cross-section that captures and seals the ionizable gas 150. A pair of filaments 121 connected through walls of the waveguide 110 via hermetic feed-throughs are used to activate the ionizable gas 150 into a plasma state 150*a* through a circuit (see FIG. 4). The filaments 121 may be located and aligned on the broad walls 110*a*. In particular, the filaments 121 may be located around the middle of the width 130*a* of the plasma chamber 130, where the voltage gradient is minimal for the dominant transverse electric TE10 mode, to minimize 19 parasitic effects of the filaments 121 in the waveguide 110 during the low loss transmission state.

When the ionizable gas 150 is not activated as illustrated in FIG. 3A, the incident RF wave 141 passes through the waveguide 110. The output RF wave 142, transmitted through the ionizable gas 150, travels toward the output port 112 with minimal loss through the inert ionizable gas 150 that has a dielectric constant of near one (1) which is close to air.

When the ionizable gas 150 is activated into an ionized plasma 150*a* state with sufficient ion density as illustrated in FIG. 3B, a plasma region 150*b*, filled with plasma 150*a*, is formed inside the plasma chamber 130. If the frequency of operation (a frequency of an incident RF waves 141) is below the plasma cutoff frequency 151, the plasma 150*a* in the plasma region 150*b* works as a metal layer and reflects the incident RF waves 141. The reflected RF waves 143 may travel back toward the input port 111. However, incident RF waves with frequencies higher than the plasma cutoff frequency 151 may pass the plasma 150*a*, and the transmitted output RF waves 144 may travel toward the output port 112. When high power RF signals are present in the waveguide 110 during the reflective ON state, the ionization density may increase naturally. However, this additional ionization from high power RF signals only enhances the reflection coefficient of the plasma media and thus the ON state is maintained.

Since the plasma cutoff frequency 151 is a function of the plasma density, the plasma RF waveguide switch 100 of the disclosed invention also works as an electronically tunable, spatial, high pass filter across the waveguide band. By varying the ionization density of the plasma 150*a* with the power level activating the filament 121, the amount of signal that passes through the reflective state can be varied, achieving an RF signal attenuator function.

Figure 4:
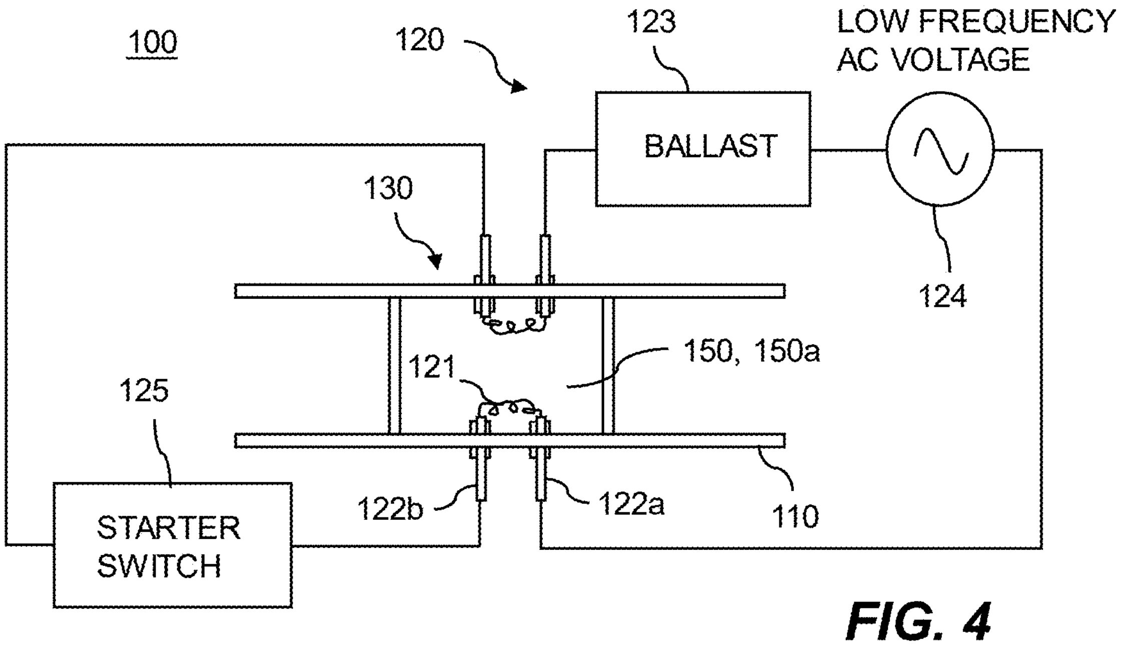
FIG. 4 is a diagram of the embodiment of the plasma RF waveguide switch in which one or more filaments are used for the activator to activate the ionizable gas, as shown in FIGS. 3A-3B.

With reference to FIG. 4, shown is a diagram of the embodiment of the plasma RF waveguide switch 100 in which one or more filaments 121 are used for the activator 120 to activate the ionizable gas 150, as shown in FIGS. 3A-3B. This circuit configuration and filament design shown in FIG. 4 is a configuration that is generally used to excite plasma in a commercial fluorescent light bulb. In this embodiment, the activator 120 includes one or more filaments 121 and a pair of filament electrodes 122*a*, 122*b* for each filament. One filament electrode 122*a* of each filament 121 is connected to ballast 123 and low frequency AC voltage source 124. The other filament electrode 122*b* is connected to starter switch 125. Use of the ballast 123 and starter switch 125 and/or electronic ballasts enables a very low-cost control circuit that implements the on and off states of the ionizable gas 150 required for the plasma RF waveguide switch 100. There is only one active bias drive state required. The transmission state (OFF state) is a passive ambient state without any required bias and negligible power consumption.

The plasma RF waveguide switch 100 of the disclosed invention solely includes plasma sources 130 which are entirely self-contained and does not require an external gas source (tank) or any form of gas pumping device. In order to prevent any leak in the plasma chamber 130, the plasma chamber 130 may be scaled by using known scaling methods and materials. When filaments 121 are used for the activator 120, the filament electrodes 122*a*, 122*b* pass through the hermetic seal of the plasma chamber 130 via hermetic electrode feed-thru to prevent any leak in the plasma chamber 130 through the filament electrode connections. Types of commonly known seals are glass-to-metal, ceramic-to-glass, and epoxy seals. Glass-to-metal implements fusion between glass, an electrical conductor, and metal to create a feedthrough. Ceramic-to-glass is a high-pressure (and more costly) alternative to glass seals, putting more stress on the seal while able to withstand higher temperatures and harsher environments. Epoxy-based hermetic feedthroughs combine epoxy resin and a housing material such as stainless steel to encapsulate an electrical conductor. Epoxy can decrease the cost per connector by creating hermetic connections using standard commercial off the shelf plastic or metal connectors. These seals are used in a wide range of applications such as semiconductors, light bulbs bases, vacuum tubes, and connectors, and enable the safe operation of electronic devices.

Figure 5A:
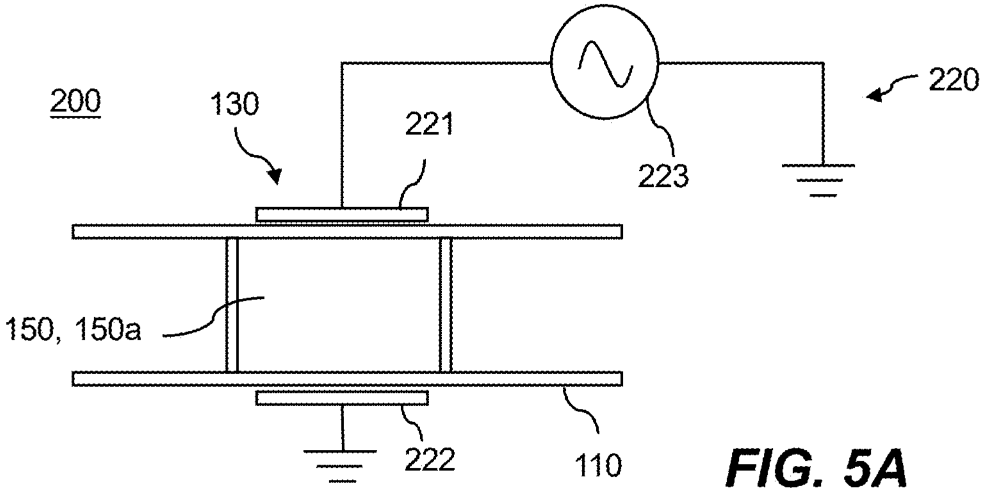
FIG. 5A is a diagram of another embodiment of the plasma RF waveguide switch in which the activator includes a capacitively coupled plasma (CCP) system.
Figure 5B:
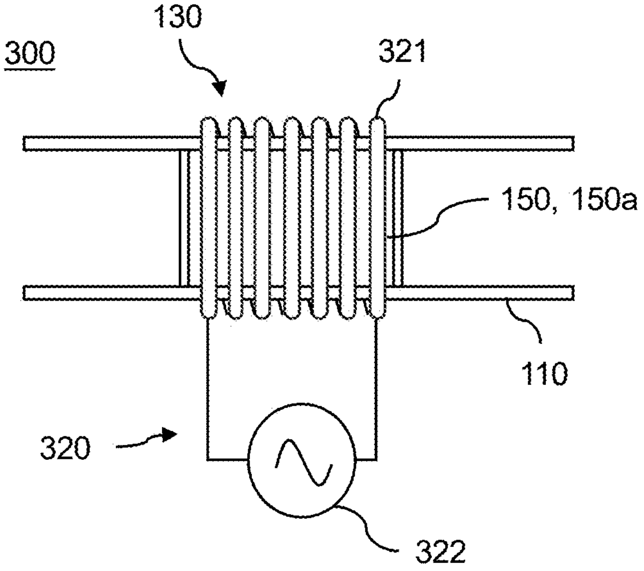
FIG. 5B is a diagram of still another embodiment of the plasma RF waveguide switch in which the activator includes an inductively coupled plasma (ICP) system.

With reference to FIG. 5A, shown is a diagram of another embodiment of the plasma RF waveguide switch 200 in which the activator 220 includes a capacitively coupled plasma (CCP) system. With reference to FIG. 5B, shown is a diagram of still another embodiment of the plasma RF waveguide switch 300 in which the activator 320 includes an inductively coupled plasma (ICP) system. The ionizable gas 150 in the self-contained plasma chamber 130 can be ionized (activated) by various activation means or systems. As shown in FIGS. 5A-5B, the ionizable gas 150 in the plasma chamber 130 of the plasma RF waveguide switch 200 is ionized (activated) by the CCP system 220, and the ionizable gas 150 in the plasma chamber 130 of the plasma RF waveguide switch 300 is ionized (activated) by the ICP system 320.

The activator 220 of the plasma RF waveguide switch 200 includes a CCP system with a capacitor that includes a first electrode layer 221 disposed outside on a wall of the plasma chamber 130 and a second electrode layer 222 disposed outside on an opposite wall of the plasma chamber 130. The first and second electrode layers 221, 222 form a capacitor with the ionizable gas 150 between the first and second electrode layers 221, 222. The first electrode layer 221 may be driven by RF voltage/current source 223, and the second electrode layer 222 may be connected to the ground. The ionizable gas 150 is activated into plasma 150*a* when an AC voltage, typically in the RF range, is applied to the first electrode layer 221, generating an oscillating electric filed.

The activator 320 of the plasma RF waveguide switch 300 includes an ICP system with induction coil 321 of conductive wire wound outside around the plasma chamber 130. The coil 321 may be driven by RF voltage/current source 322 to generate electromagnetic induction. The ionizable gas 150 is activated into plasma 150*a* when an alternating current, typically in the RF range, flows through the coil 321, generating an oscillating magnetic field. FIG. 5B exemplarily illustrates an ICP system with an induction coil surrounding the plasma chamber 130. However, the ICP system may be constructed to use antenna or toroidal inductors to generate electromagnetic induction.

The ICP and CCP approaches remove the need for filaments and electrodes passing through a hermetic seal of the plasma chamber 130. In the plasma RF waveguide switches 200 and 300, the capacitor or inductor couples microwave energy into the self-contained plasma chamber 130 rather than using filaments 121 and filament electrodes 122*a*, 122*b* inside the chamber 130. By using the CCP system 220 and ICP system 320, the disclosed invention intends to prevent the plasma gas from leaking out of the waveguide, thereby creating an airtight seal or enclosure.

Figure 6A:
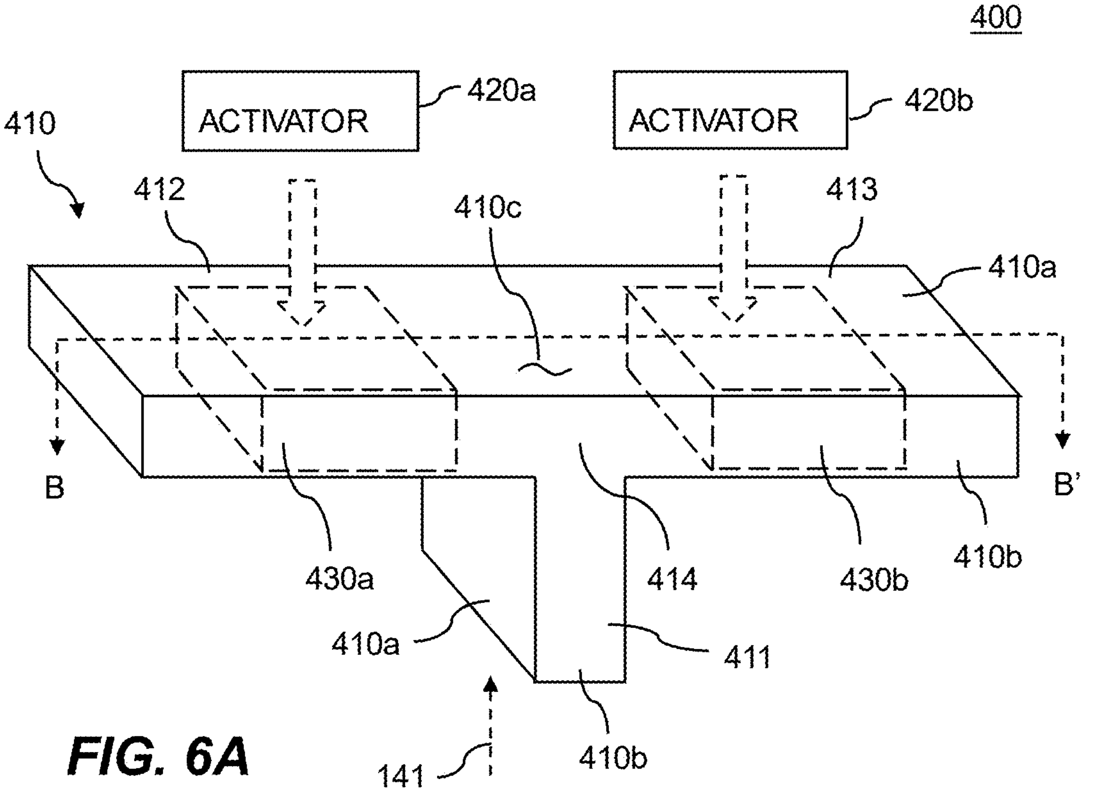
FIG. 6A is a perspective view diagram of single pole double throw (SPDT) switch that utilizes the plasma RF waveguide switch of the disclosed invention.
Figure 6B:
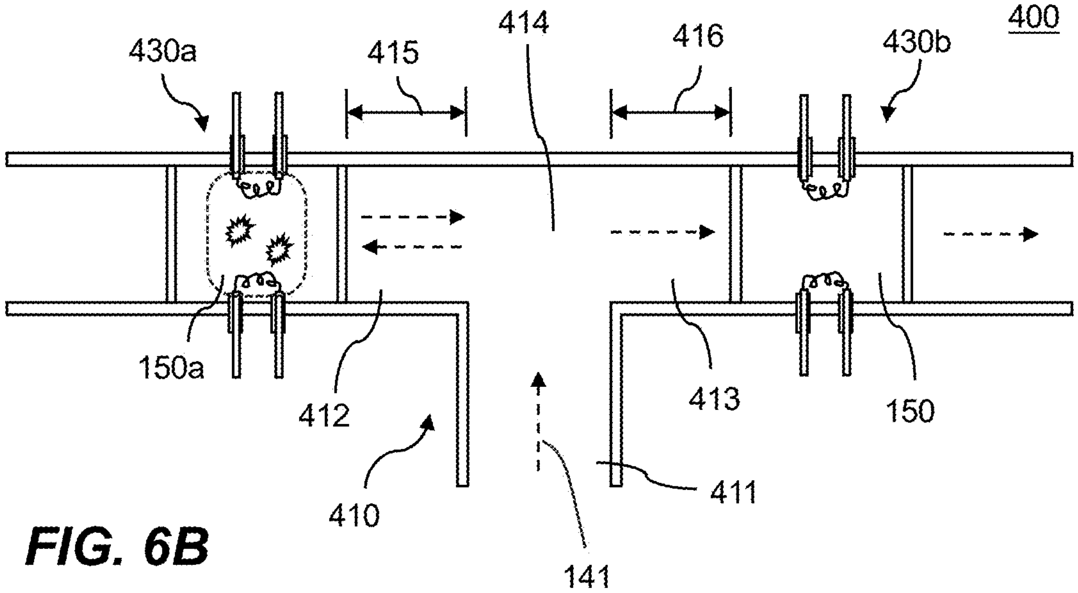
FIG. 6B is a cross-sectional view of the SPDT switch along the line B-B' shown in FIG. 6A.

With reference to FIG. 6A, shown is a perspective view diagram of single pole double throw (SPDT) switch 400 that utilizes the plasma RF waveguide switch 100, 200, 300 of the disclosed invention. With reference to FIG. 6B, shown is a cross-sectional view of the SPDT switch 400 along the line B-B' shown in FIG. 6A.

The SPDT switch 400 includes a waveguide 410 that includes an input section 411, a first output section 412, and a second output section 413. The first and second output sections 412, 413 are separated from the input section 411 at the waveguide junction 414. The waveguide 410 defines an inner space 410*c* that direct RF signals. The waveguide 410 has broad walls 410*a* and narrow walls 410*b* as shown in FIG. 6A. The broad walls 410*a* and the narrow walls 410*b* define the inner space 410*c* inside the waveguide 410. Herein, the broad walls 410*a* are walls having relatively 16 greater widths among walls of the waveguide 410, and the narrow walls 410*b* are walls having relatively smaller widths among walls of the waveguide 410.

The input section 411 receives an input RF signal 141. The SPDT switch 400 further includes a first plasma chamber 430*a* placed in the first output section 412 and a second plasma chamber 430*b* placed at the second output section 413. The input RF signal 141 may be directed 21 to the first output section 412 and/or the second output section 413 based on activation states of the first and second plasma chambers 430*a*, 430*b*. The SPDT switch 400 further includes first activator 420*a* configured to activate plasma in the first plasma chamber 430*a*, and second activator 420*b* configured to activate plasma in the second plasma chamber 430*b*. The activators 420*a*, 420*b* may include filament system described referring to FIG. 4, the CCP system described referring to FIG. 5A, or the ICP system described referring to FIG. 5B.

The first and second plasma chambers 430*a*, 430*b* are each spaced λ/4 away from a waveguide junction 414, where λ is the wavelength of the input RF signal 141. In other words, the distance 415 between the first plasma chamber 430*a* and the waveguide junction 414 is a quarter of the wavelength (λ/4) of the input RF signal 141, and the distance 416 between the second plasma chamber 430*b* and the waveguide junction 414 is a quarter of the wavelength (λ/4) of the input RF signal 141. This configuration creates an open circuit (via quarter wave transform) in shunt with the non-activated waveguide path, maintaining low loss transmission in this non-activated path.

FIG. 6B exemplarily shows a switching state in which the first plasma chamber 430*a* is activated, while the second plasma chamber 430*b* is not activated. In this state, the plasma in the first plasma chamber 430*a* works as a reflector, and it creates an open circuit at the waveguide junction 414 when spaced λ/4 away. The input RF signal 141 passes through the second plasma chamber 430*b*. However, the input RF signal 141, when its frequency is lower than the plasma cutoff frequency of the plasma in the first plasma chamber 430*a*, is reflected at the first plasma chamber 430*a* and is routed to the second plasma chamber 430*b*. In this way, the input RF signal 141 is output through the second output section 413.

FIG. 6B exemplarily shows a SPDT switch 400 in which the first and second plasma chambers 430*a*, 430*b* are controlled (activation or non-activation) by the filaments 121 as shown in FIGS. 3A and 3B. However, in another embodiment of the SPDT switch, the first and second plasma chambers 430*a*, 430*b* may be activated by the CCP system 220 as shown in FIG. 5A. In still another embodiment of the SPDT switch, the first and second plasma chambers 430*a*, 430*b* may be activated by the ICP system 320 as shown in FIG. 5B.

FIGS. 6A-6B also exemplarily show a SPDT switch configuration. However, many variations of switch configurations, such as single pole single throw (SPST) and double pole double throw (DPDT) configurations, can be constructed by using the plasma RF waveguide switch 100, 200, 300 of the disclosed invention to serve other RF signal control functions.

Figure 7:
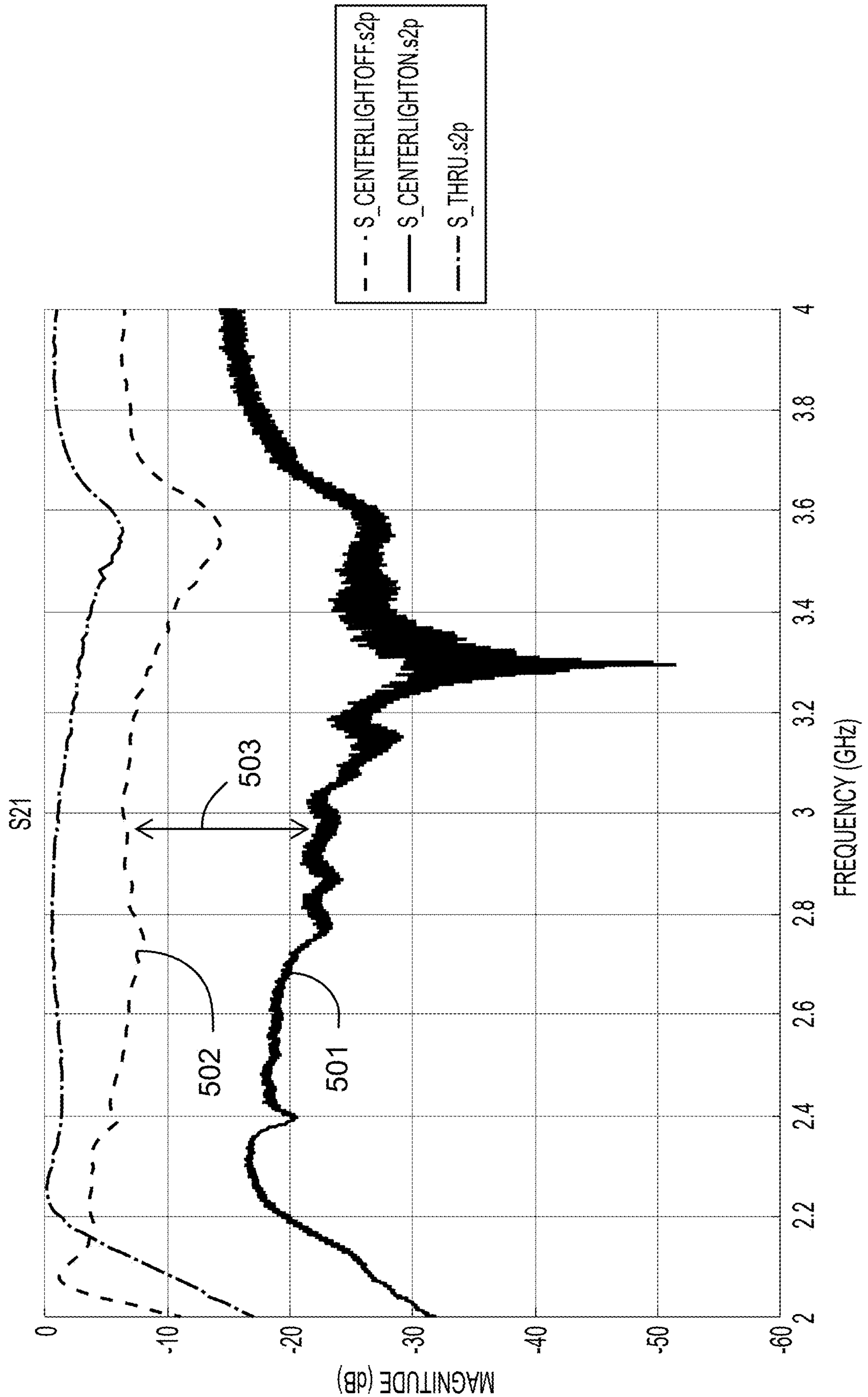
FIG. 7 shows S-band transmission characteristics (S21 (dB) vs. frequency) of the plasma RF waveguide switch of the disclosed invention

With reference to FIG. 7, shown are S-band transmission characteristics (S21 (dB) vs. frequency) of the plasma RF waveguide switch of the disclosed invention. The transmission measurement was conducted by using a 40 watt fluorescent light bulb and open ended coax to waveguide adapters. The results in FIG. 7 show transmission in the isolation state (ON state) with activated plasma compared to the transmission in low loss state (OFF state) with plasma deactivated. The graph 501 represents transmissions when the bulb is in ON state, and the graph 502 represents transmissions when the bulb is in OFF state. The transmission difference 503 between the ON state 501 and the OFF state 502 is greater than 15 dB with 40 watt ionization power for one (1) inch diameter tubular plasma region. Isolation would be increased with a thicker or fully enclosed region, which is easily implemented in embodiments of the plasma RF waveguide switch. Increasing the power above 40 watts may result in greater ionization density, and therefore higher isolation through the plasma state may be achieved.

The transmission characteristics in FIG. 7 is measured in S-band. Additional measurements over the X, Ku and Ka-band resulted in negligible differences in transmission characteristics. This was to be expected since the plasma cutoff frequency was exceeded at these higher frequencies.

Additionally, the minimum switching speed was less than one (1) millisecond (already 50 times faster than modern electromechanical switches). Plasma switches engineered for fast turn on times can switch in less than 10 picoseconds, making their performance ceiling orders of magnitude faster than any state of the art waveguide switch.

The plasma RF waveguide switch of the disclosed invention has the potential to greatly reduce cost by avoiding the use of semiconductor diodes, such as positive-intrinsic-negative (PIN) diodes, which require sophisticated foundry processing and significant switching control circuitry. Two active bias states are required to control the PIN diode as an RF switch. A high reverse bias is needed for the high impedance state to stave off conduction in the presence of the RF signal. A forward current drive state is also required to maintain a low impedance state, again to stave off switch conduction loss caused by the RF signal. The plasma RF waveguide switch of the disclosed invention leverages design methodology that is commercially available in the florescent light bulb industry. This design has proven very low cost and only requires a single active state, whereas the PIN diode requires two active bias states.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A plasma radio-frequency (RF) waveguide switch, comprising:

a waveguide defining an inner space and having an input port for receiving an RF signal and an output port;

a plasma chamber placed in the inner space, wherein the plasma chamber is self-contained and hermetically sealed, and wherein the plasma chamber comprises a first dielectric hermetic waveguide window at a side of the plasma chamber and a second dielectric hermetic waveguide window at an opposite side of the plasma chamber;

ionizable gas contained in the plasma chamber; and at least one activator configured to activate the ionizable gas into a plasma state.

2. The plasma RF waveguide switch of claim 1 wherein the ionizable gas includes argon, xenon, neon, krypton, hydrogen and/or helium.

3. The plasma RF waveguide switch of claim 1 wherein the first and second dielectric hermetic waveguide windows are $\lambda/2$ thick or electrically thin, where $\lambda$ is a wavelength of the RF signal received in the waveguide.

4. The plasma RF waveguide switch of claim 1 wherein the activator comprises one or more filaments placed inside the plasma chamber and filament electrodes through hermetic feedthroughs connecting the one or more filaments to a ballast.

5. The plasma RF waveguide switch of claim 4 wherein the one or more filaments are placed along broad walls of the waveguide near the middle of a width of the plasma chamber, minimizing the parasitic effects on the RF signal since the electric field gradients are minimal at the center of waveguide broad wall.

6. The plasma RF waveguide switch of claim 1 wherein the activator comprises a capacitor comprising a first electrode layer disposed outside the plasma chamber and a second electrode layer disposed outside the plasma chamber facing the first electrode layer.

7. The plasma RF waveguide switch of claim 1 wherein the activator comprises an induction coil disposed outside the plasma chamber.

8. A single pole double throw (SPDT) switch, comprising:

a waveguide defining an inner space and comprising an input section for receiving an RF signal and a first and second output sections that separate from the input section at a waveguide junction of the waveguide;

a first plasma chamber placed in the first output section, wherein the first plasma chamber is self-contained and hermetically sealed, and wherein the first plasma chamber comprises a first dielectric hermetic waveguide window at a side of the first plasma chamber and a second dielectric hermetic waveguide window at an opposite side of the first plasma chamber;

a second plasma chamber placed in the second output section, wherein the second plasma chamber is self-contained and hermetically sealed, and wherein the second plasma chamber comprises a first dielectric hermetic waveguide window at a side of the second plasma chamber and a second dielectric hermetic waveguide window at an opposite side of the second plasma chamber;

ionizable gas contained in the first and second plasma chambers;

a first activator configured to activate the ionizable gas in the first plasma chamber into a plasma state; and a second activator configured to activate the ionizable gas in the second plasma chamber into a plasma state.

9. The SPDT switch of claim 8 wherein a distance between the waveguide junction and the first plasma chamber is $\lambda/4$, where the $\lambda$ is a wavelength of the RF signal received in the input section.

10. The SPDT switch of claim 8 wherein a distance between the waveguide junction and the second plasma chamber is $\lambda/4$, where the $\lambda$ is a wavelength of the RF signal received in the input section.

11. The SPDT switch of claim 8 wherein the ionizable gas includes argon, xenon, neon, krypton, hydrogen and/or helium.

12. The SPDT switch of claim 8 wherein the first and second dielectric hermetic waveguide windows of the first plasma chamber are $\lambda/2$ thick or electrically thin, and the first and second dielectric hermetic waveguide windows of the second plasma chamber are $\lambda/2$ thick or electrically thin, where $\lambda$ is a wavelength of the RF signal received in the input section.

13. The SPDT switch of claim 8 wherein the first activator comprises one or more filaments placed inside the first plasma chamber and filament electrodes connecting the one or more filaments to a ballast, and the second activator comprises one or more filaments placed inside the second plasma chamber and filament electrodes connecting the one or more filaments to the ballast.

14. The SPDT switch of claim 13 wherein the one or more filaments of the first activator are placed along broad walls of the waveguide near the middle of a width of the first plasma chamber, and the one or more filaments of the second activator are placed along broad walls of the waveguide near the middle of a width of the second plasma chamber.

15. The SPDT switch of claim 8 wherein the first activator comprises a capacitor comprising a first electrode layer disposed outside the first plasma chamber and a second electrode layer disposed outside the first plasma chamber facing the first electrode layer, and the second activator comprises a capacitor comprising a first electrode layer disposed outside the second plasma chamber and a second electrode layer disposed outside the second plasma chamber facing the first electrode layer.

16. The SPDT switch of claim 8 wherein the first activator comprises an induction coil disposed outside the first plasma chamber, and the second activator comprises an induction coil disposed outside the second plasma chamber.

* * * * *